United States Patent [19]

Yamauchi et al.

[11] 4,136,456
[45] Jan. 30, 1979

[54] HOLE GAUGE

[75] Inventors: Mineo Yamauchi; Masao Nakahara, both of Kawasaki, Japan

[73] Assignee: Kabushiki Kaisha Mitutoyo Seisakusho, Tokyo, Japan

[21] Appl. No.: 748,888

[22] Filed: Dec. 9, 1976

[30] Foreign Application Priority Data

Dec. 10, 1975 [JP] Japan .................. 50-167084[U]

[51] Int. Cl.² .......................... G01B 5/12; G01B 3/18
[52] U.S. Cl. .............................. 33/164 C; 33/178 R
[58] Field of Search ............... 33/147 K, 162, 164 C, 33/178 R, 178 F

[56] References Cited

U.S. PATENT DOCUMENTS

| 953,282 | 3/1910 | Nash | 33/178 R |
|---|---|---|---|
| 1,760,717 | 5/1930 | Peglow | 33/178 R |
| 1,806,893 | 5/1931 | Cunningham | 33/164 C |
| 1,921,522 | 8/1933 | Hamer | 33/178 R |
| 3,608,201 | 9/1971 | Butsch | 33/164 C |

FOREIGN PATENT DOCUMENTS 32046  7/1923  Denmark ................. 33/178 R

*Primary Examiner*—Richard E. Aegerter
*Assistant Examiner*—Richard R. Stearns
*Attorney, Agent, or Firm*—Brisebois & Kruger

[57] ABSTRACT

The present invention relates to a hole gauge for measuring the inner diameter of a hole, which gauge comprises an axially movable spindle; a pair of tapered surfaces movable together with said spindle; a pair of contact points radially movable with respect to said spindle, guided by said pair of tapered surfaces; and a support arm for said pair of contact points, the outer surfaces of said contact points and said support arm being movable in parallel radially of said spindle.

7 Claims, 1 Drawing Figure

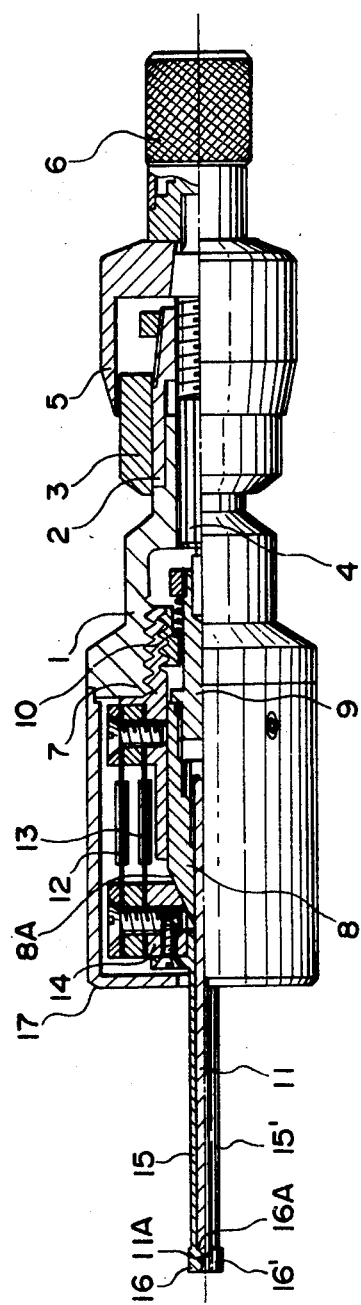

HOLE GAUGE

BACKGROUND OF THE INVENTION

The present invention relates to a hole gauge in which a pair of contact points are relatively drawn farther from or closer to each other, while guided by tapered surfaces which are movable together with a spindle, so that the inner diameter of a small hole can be measured.

There is a conventional hole gauge of this type, in which a pair of highly elastic support arms are attached at one end to the body cover and at the other end fitted with contact points having hemisperhical outer surfaces; and in which said contact points are adapted to be moved by tapered surfaces which are themselves axially movable together with a spindle, radially of said spindle.

In a hole gauge of this type, however, in which the support arms are flexible so that the distance between two hemispherical contact points may be variable, it is necessary to shake the whole gauge until the distance between the outer surface of the contact points, turning within a hole to be measured, becomes maximum, where the outer surfaces of the contact points can match the inner diameter of the hole.

SUMMARY OF THE INVENTION

The main object of the present invention is to provide a hole gauge which can measure the inner diameter of a hole to be measured accuuratley, simply and swiftly by a mere process of setting the outer surfaces of contact points against the inner wall of a hole to be measured.

Other and further objects, features and advantages of the invention will appear more fully from the following description.

BRIEF DESCRIPTION OF THE DRAWING

The drawing is a side view, partially in axial section illustrating a hole gauge as one embodiment of the present invention.

DETAILED DESCRIPTION OF THE INVENTION

One embodiment of the present invention will now be described with reference to the accompanying drawing.

An inner sleeve 2 fits around one end of a tubular main body 1 and around said inner sleeve 2 fits a sleeve 3. Within said main body 1 a spindle 4 is slidable of the assembly, one end of said spindle 4 being screwed into said inner sleeve 2 so as to move in the axial direction of said sleeve 2 when the two are relatively rotated. Around the sleeve 3 rotatably fits a thimble 5, one end of which is fitted to said spindle 4. 6 is an operating knob integral with said spindle 4. A scale for reading the measured value (not shown) is provided around said sleeve 3 and said thimble 5 respectively just as in a micrometer.

Within the other end of the main body 1 is screwed a tubular spring-holder 7, within which fits a tubular arm-expanding shaft 8 which is slidable within said body in the axial direction. To one end of said arm-expanding shaft 8 is screwed one end of an intermediate shaft 9, the other end of which bears against the spindle 4. Between said spring-holder 7 and said intermediate shaft 9 is a coil spring 10, which urges said intermediate shaft 9 toward the spindle 4. Within the other end of said arm-expanding shaft 8 is screwed one end of the contact point-expanding shaft 11. At the tip of the other end of said contact point-expanding shaft 11 is formed a first tapered surface 11A, while at said other end of said arm-expanding shaft 8 is formed a second tapered surface 8A. These tapered surfaces 8A, 11A are formed with the same slope toward the tip of said contact point-expanding shaft 11.

One end of each of a pair of leaf springs 12, 13 parallel to the axis of the spindle 4 is attached to the spring-holder 7. Another pair of leaf springs on the opposite side of the longitudinal axis is not shown in the figure. At the other ends of said leaf springs 12, 13 an expander 14 is mounted in contact with said second tapered surface 8A. One end of a support arm 15 is detachably mounted on said expander 14 parallel to the axis of said contact point-expanding shaft 11. The tip of said support arm 15 carries an integral contact point 16 having a semi-cylindrical outer surface extending parallel to the axis of said contact point-expanding shaft 11, projection 16A extending inwardly from said contact point 16 being in contact with said first tapered surface 11A. Reference numeral 16' indicates a contact point with a semi-cylindrical outer surface which is opposed to the contact point 16 and lies on the opposite side of the contact point-expanding shaft 11.

In this embodiment there is a pair of expandable contact points 16, 16', but it goes without saying that three expandable contact points could be used.

Just like the contact point 16, the contact point 16' is supported by the spring-holder 7 through two leaf springs (not shown), an expander (not shown) and a support arm 15'.

A key groove (not shown) is axially cut on either the intermediate shaft 9 or the spring-holder 7 while a key (not shown) fitting said key groove is provided, so that circumferential movement of said intermediate shaft 9 is prevented, while its axial sliding only is permitted. Reference numeral 17 indicates a tubular cover for the spring-holder 7, its parallel springs 12, 13 and the expander 14, said cover being integral with the main body 1.

In a hold gauge of such construction, rotation of the operating knob 6 causes the spindle 4 to move in its axial direction.

The movement of said spindle 4 causes axial movement of said arm-expanding shaft 8 and said contact point-expanding shaft 11. As the result the contact points 16, 16' in contact with said first tapered surface 11A are guided along said first tapered surface 11A and displaced radially of the contact point-expanding shaft 11.

At the same time the expander 14 in contact with the second tapered surface 8A is guided along said second tapered surface to move in the same direction as said contact points; and consequently the support arms 15, 15', which are maintained parallel to each other, move radially of said contact point-expanding shaft 11. Thus the contact points 16, 16', with their outer surfaces held parallel to the axis of said contact point-expanding shaft 11, can move radially of said contact point-expanding shaft.

In this way, the contact points 16, 16' are pressed against the inner wall of a hole to be measured, so that the reading of the displacement of the spindle 4 from the scales on the sleeve 3 and the thimble 5 gives the inner diameter of the hole.

In the above embodiment, the expander 14 is supported at the sides of the assembly and at the same time by means of two parallel leaf springs 12, 13 it is urged toward the second tapered surface 8A. The arrangement, however, is not restricted to this; it may be arranged so that the expander 14 is fitted to the cover 17 so as to slide radially of the arm-expanding shaft 8, while between the cover 17 and the expander 14 a coil spring is inserted to urge the expander 14 toward the second tapered surface 8A.

As described above, in the hole gauge of the present invention the axially movable contact point-expanding shaft is provided with the first and second tapered surfaces for radial displacement of the contact points and their support arms in the same plane with the same slope. Therefore a pair of support arms maintained parallel to each other can be radially displaced. Thus when a pair of contact points provided in a semi-cylindrical fashion have their outer surfaces parallel to the axis of said contact point-expanding shaft, said contact points with their outer surfaces held parallel to said axis can displace radially of the contact point-expanding shaft. Thereby the inner diameter of a hole can be measured accurately, readily and quickly by merely contacting the outer surfaces of the contact points to the inner wall of the hole to be measured, instead of shaking the gauge as a whole as before to find out the true inner diameter of the hole.

What is claimed is:

1. A hole gauge comprising
   a main supporting body having an opening communicating with an interior space in said body,
   a spindle and means for axially moving said spindle forwardly and rearwardly with respect to said opening in said body;
   a plurality of elongated support arms projecting axially from the opening in said body, said arms having rearward ends mounted within said body by means mounting said arms and preventing axial movement thereof with respect to said body, and forward ends remote from said body;
   contact points fixed to said forward ends of said arms;
   a contact point expanding shaft engaging said spindle and mounted to move axially with said spindle, said shaft comprising
      a forward portion projecting axially from said body between said arms and having first tapered surface means engaging each of said arms at a first contact location remote from said body for expanding said forward ends of said arms, and
      an intermedaite portion having second tapered surface means engaging each of said arms at a second contact location remote from said contact points for expanding said arms;
   each of the associated first and second tapered surface means having the same inclination and facing in the same direction so that said forward and rearward ends of said arms are expanded the same radial distance simultaneously, in response to movement of said shaft; and
   said mounting means including spring means for each arm supported by said body for urging the associated arm radially toward said contact point expanding shaft.

2. A hole gauge according to claim 1 wherein said second tapered surface means comprises tapered surface means spaced substantially further apart than said first tapered surface means.

3. A hole gauge according to claim 2 wherein said forward portion of said contact point expanding shaft comprises a part detachably connected to said intermediate portion, said part having threads at a location remote from said first tapered surface means, said intermediate portion having mating threads, and said forward portion being threadedly joined to said intermediate portion.

4. A hole gauge according to claim 1 wherein each of said spring means comprises parallel leaf springs for urging said arms radially into engagement with said contact point expanding shaft.

5. A hole gauge according to claim 4 wherein said leaf springs mount said arms on said body against axial movement.

6. A hole gauge comprising
   a main supporting body having an opening communicating with an interior space in said body,
   a spindle and means for axially moving said spindle forwardly and rearwardly with respect to said opening in said body;
   a plurality of elongated support arms projecting axially from the opening in said body, said arms having forward ends remote from said body and rearward ends supported by said body by means mounting said arms and preventing axial movement thereof, said forward ends of said arms being wholly exposed and unsupported by said supporting body;
   contact points fixed to said forward ends of said arms;
   a contact point expanding shaft engaging said spindle and mounted to move axially with said spindle, said shaft including
      a forward end projecting axially from said body between said arms and having a first tapered surface means engaging each of said arms at a first contact location remote from said body for expanding said forward ends of said arms, said forward end of said shaft being wholly unsupported by said supporting body, and an intermediate portion having second tapered surface means engaging each of said arms at a second contact location adjacent said supporting body and remote from said contact points and forward end of said shaft for expanding said arms;
   each of the associated first and second tapered surface means having the same inclination and facing in the same direction so that said arms are maintained parallel and are expanded the same radial distance simultaneously, in response to movement of said shaft; and
   said mounting means including spring means for each arm supported by said body and mounting said arms adjacent the rearward end thereof for urging said arms radially into engagement with said first and second tapered surface means of said contact point expanding shaft, said spring means forming the sole means for maintaining said arms in engagement with said first and second tapered surface means.

7. A hole gauge as claimed in claim 1, in which said contact points are semi-cylindrical.

* * * * *